No. 666,580. Patented Jan. 22, 1901.
J. P. VAN SICKLE.
HOSE NOZZLE.
(Application filed June 6, 1900.)
(No Model.)
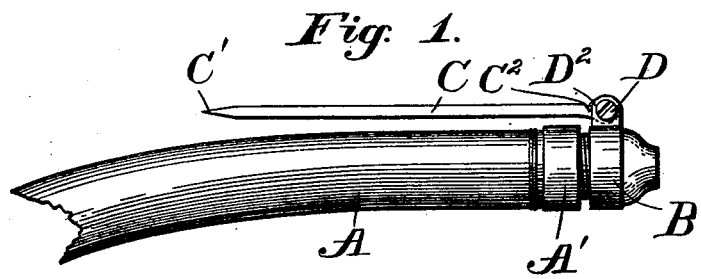
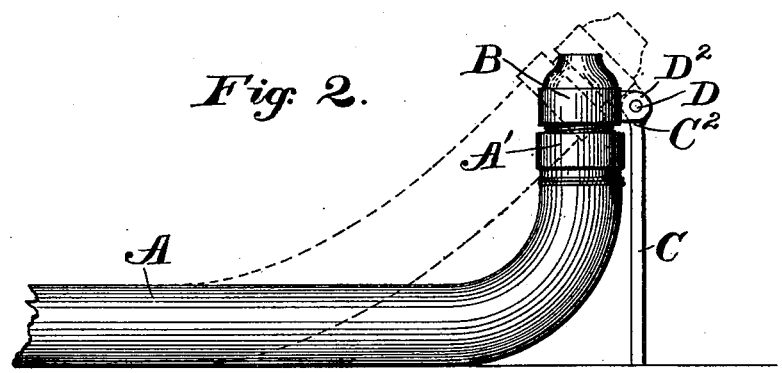
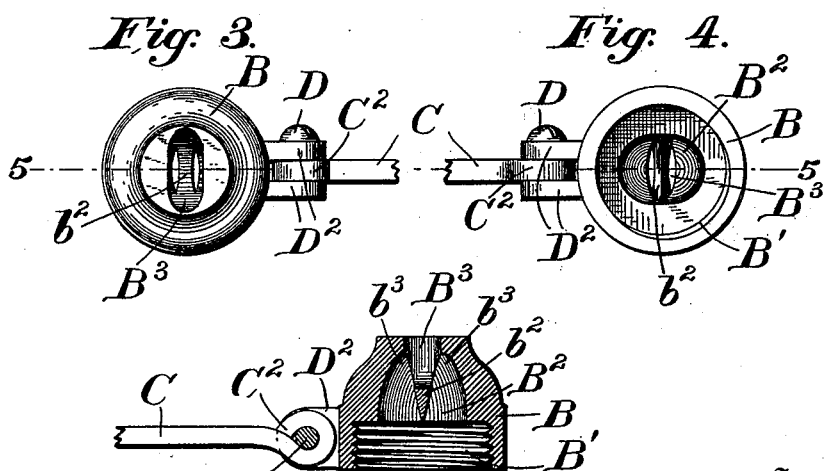
Witnesses
Percy C. Bowen
John Chalmers Wilson
Inventor
John P. Van Sickle
by Willis, Bennett & Nelly
Attorneys

UNITED STATES PATENT OFFICE.

JOHN PULASKI VAN SICKLE, OF PASADENA, CALIFORNIA.

HOSE-NOZZLE.

SPECIFICATION forming part of Letters Patent No. 666,580, dated January 22, 1901.

Application filed June 6, 1900. Serial No. 19,315. (No model.)

*To all whom it may concern:*

Be it known that I, JOHN PULASKI VAN SICKLE, a citizen of the United States, residing at Pasadena, in the county of Los Angeles and State of California, have invented certain new and useful Improvements in Hose-Nozzles; and I do hereby declare the following to be a full, clear, and exact description of the invention, such as will enable others skilled in the art to which it appertains to make and use the same.

My invention relates to improvements in hose-nozzles; and it consists in certain novel features hereinafter described and claimed.

My invention will be understood by reference to the accompanying drawings, wherein the same parts are indicated by the same letters of reference throughout the several views.

Figure 1 is a side elevation of the end of a hose provided with my improved form of nozzle, the standard or rod pivoted thereto being shown in folded position. Fig. 2 is also a side elevation of the same parts, the rod or standard being shown as stuck into the earth and supporting the hose-nozzle in a vertical position. Fig. 3 is a front end view of the hose-nozzle. Fig. 4 is a rear end view thereof, and Fig. 5 is a sectional view taken on the line 5 5 in Figs. 3 and 4.

A represents a portion of elastic garden-hose provided with a screw-threaded metallic connection A'. The nozzle B is provided with internal screw-threads B', which fit the screw-threads on the connection A'. The nozzle has an opening $B^2$, somewhat elliptical and contracted toward its forward end, leading forwardly from the screw-threaded portion B', and this opening $B^2$ connects at the forward end of the nozzle with a smaller opening $B^3$, which is elliptical in cross-section and formed with its greatest length at right angles to the greatest length of the opening $B^2$.

Transversely across the opening $B^2$ is arranged a wedge-shaped integral piece $b^2$, which serves to divide the stream of water passing through the nozzle. Thus the stream of water passing through the nozzle is divided by the wedge-shaped piece $b^2$, and, passing through the opening $B^2$, the two divisions of the stream are forced together by the strong angles of deflection formed by the rounded and contracted portions $b^3$ of the opening $B^2$, effecting thereby their thorough breaking up into a spray as the pressure of the stream of water carries it on through $B^3$, from which it is discharged by reason of the shape (elliptical and otherwise) of the opening $B^3$ into a fan-shaped spray of greater or less thickness.

In order that the nozzle may be set in any desired position for sprinkling a lawn or garden without being necessarily held by a person, the said nozzle is provided with a supporting-standard, which is preferably in the form of a metallic rod C, having a pointed end C' and pivotally connected at its opposite end $C^2$ by means of a screw or bolt D to a pair of lugs $D^2$ on the periphery of the nozzle B. The screw or bolt D should preferably bind the end $C^2$ of the rod C, so that the latter may be held by frictional contact with the said lugs in any desired position with respect to the nozzle after having been turned to such position. Thus if the nozzle is to be held by a person the rod C would be turned down flat against the side of the hose, as shown in Fig. 1; but if it be desired to set the nozzle for spraying continuously without being held by a person the rod may be set at any desired angle and its pointed end stuck into the earth to hold the nozzle in the position desired, such as is shown in full lines or in dotted lines in Fig. 2.

From the foregoing it will be seen that I provide a very cheap, simple, and efficient spraying-nozzle which may be applied to any ordinary garden-hose and which will produce a good spray for sprinkling a lawn or garden or other locality desired.

Having thus described my invention, what I claim, and desire to secure by Letters Patent of the United States, is—

1. A spraying hose-nozzle comprising an internally-screw-threaded portion for engagement with a hose connection at the rear of the said nozzle, an elliptical discharge-opening at the forward end of the said nozzle, and a forwardly-contracted passage leading from the rear of the said nozzle to the said discharge-opening, substantially as described.

2. A spraying hose-nozzle comprising an internally-screw-threaded portion for engagement with a hose connection at the rear of the said nozzle, an elliptical discharge-opening at the forward end of the said nozzle, a forwardly-contracted passage leading from the rear of the said nozzle to the said discharge-opening, and a wedge-shaped deflector arranged transversely of the said passage in line with the longest dimension of the discharge-opening, and arranged to divide the stream into two parts, substantially as described.

In testimony whereof I affix my signature in presence of two witnesses.

JOHN PULASKI VAN SICKLE.

Witnesses:
B. W. DIEHL,
WILLIAM CHAMBERS.